United States Patent [19]

Zwirner

[11] Patent Number: 4,696,510
[45] Date of Patent: Sep. 29, 1987

[54] SWIVEL BEARING FOR AUTOMOBILE SUN VISORS

[75] Inventor: Gerhard Zwirner, Haan, Fed. Rep. of Germany

[73] Assignee: Gebr. Happich GmbH, Fed. Rep. of Germany

[21] Appl. No.: 882,084

[22] Filed: Jul. 3, 1986

[30] Foreign Application Priority Data

Jul. 5, 1985 [DE] Fed. Rep. of Germany ....... 3524098

[51] Int. Cl.$^4$ ............................................... B60J 3/02
[52] U.S. Cl. .............................. 296/97 K; 248/289.1
[58] Field of Search ........................... 296/97 K, 97 R; 248/289.1

[56] References Cited

U.S. PATENT DOCUMENTS 2,167,962 8/1939 Sovis .................................. 296/97 K
3,017,217 1/1962 Keating ............................. 296/97 K

FOREIGN PATENT DOCUMENTS 1390555 4/1975 United Kingdom ............. 296/97 K

Primary Examiner—Robert R. Song
Attorney, Agent, or Firm—Ostrolenk, Faber, Gerb & Soffen

[57] ABSTRACT

A swivel bearing for automobile sun visors has a bearing housing with a mounting bore which is circularly shaped at the entrance into the mounting bore and which gradually widens along one axis to be oblong at the outlet from the mounting bore. The short mounting arm of a L-shaped shaft, on which shaft the sun visor body is supported, is received in the mounting bore. The section of the mounting arm located within the mounting bore is itself conically narrowed between the entrance and the outlet from the mounting bore. From the inlet to the outlet, the mounting bore widens along the long axis of the bore to define a slot in which the mounting arm can pivot in a manner which allows alignment of the shaft with respect to an outer support housing in which the free end of the shaft is detachably receivable.

7 Claims, 3 Drawing Figures

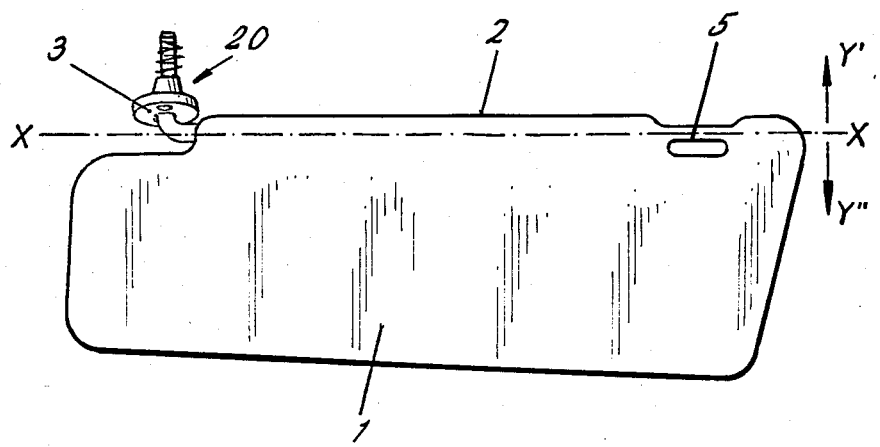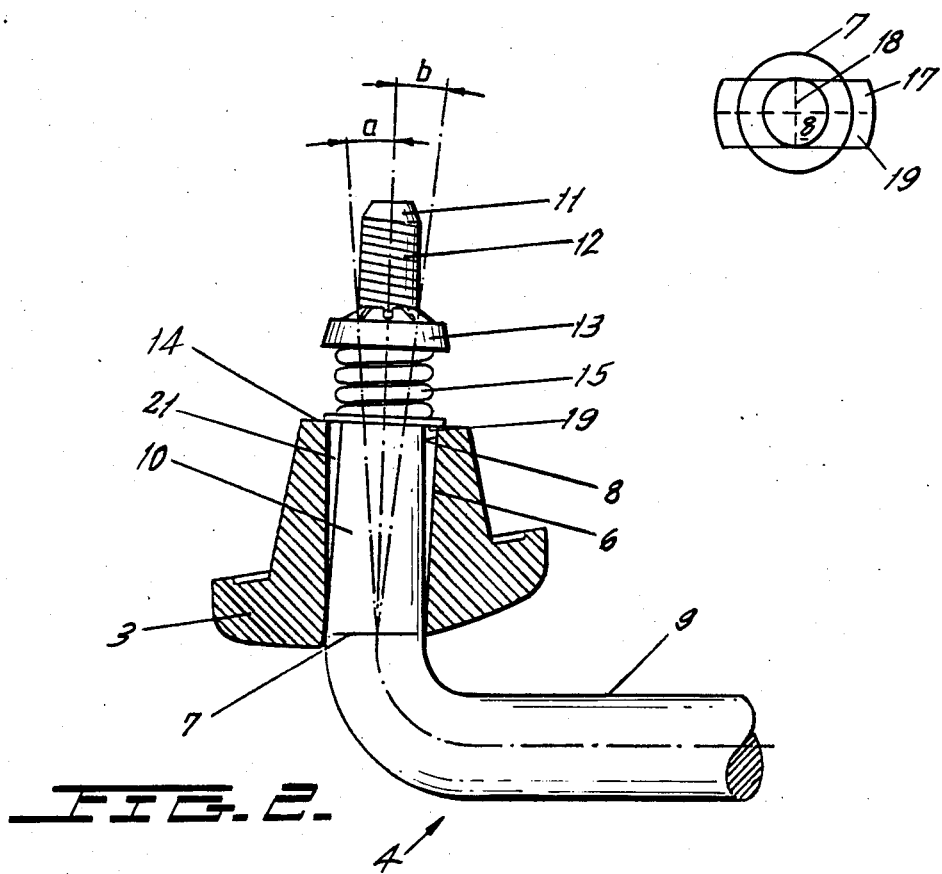

SWIVEL BEARING FOR AUTOMOBILE SUN VISORS

BACKGROUND OF THE INVENTION

The present invention relates to a swivel bearing for an automobile sun visor, and more particularly to a swivel bearing that accommodates the shaft of the sun visor with some "play". The modified swivel bearing facilitates mounting of the sun visor to a vehicle and reduces mechanical stress that may otherwise develop due to hardware misalignments.

The swivel bearing includes a bearing housing which can be fastened to the body of the vehicle. A conical mounting bore extends through the bearing housing for accommodating therein the short mounting arm of an L-shaped sun visor shaft. The longer support arm of the shaft supports the body or main panel of the sun visor. The short mounting arm of the shaft does not have a uniform axial cross section. Rather, it tapers conically and has a smaller cross section near its free end. The mounting arm is long enough that the free end of the mounting arm protrudes out of the mounting bore of the bearing housing and that end bears a compression spring and other hardware to retain the mounting arm in the bearing housing.

The longer support arm of the L-shaped sun visor shaft passes through the upper edge region of the sun visor body. At least a portion of the free end of the support arm is exposed and this exposed portion can be detachably attached to an outer support housing which is fastened to the body of the vehicle in the familiar manner. The sun visor body can be rotated around an axis of rotation defined by the support arm to a position to partially block the windshield. Alternatively, the visor body can be rotated about its short mounting arm, which enables blocking of the side window.

The sun visor body can be supported at two ends, namely at the swivel bearing and at its outer end, but only when the visor body is located in front of the windshield. When the visor body is at the side window position, the sun visor is supported only on the swivel bearing.

The support arm of the sun visor shaft should be precisely aligned with the outer support housing to assure unimpeded and stress free removal and insertion of the shaft into and out of the outer support housing. If they are not precisely aligned, mechanical stresses develop, which can lead to deformations in the swivel bearing region. However, exact alignment of the sunvisor shaft at both the swivel bearing end and at the outer support housing is difficult due to manufacturing tolerances of both the sun visor and the vehicle.

Federal Republic of Germany Utility Model No. 1 921 866 (corresponding to U.S. Pat. No. 3,339,923) describes a swivel bearing for automobile sun visors which has a mounting housing which is fastenable to the body of a vehicle and an L-shaped sun-visor shaft. The mounting arm of the sun-visor shaft is seated in a mounting bore by way of a rotary member which is in turn swingably mounted in a mounting receiver built into the bearing housing. This swivel bearing arrangement has the advantage of providing "play" for the sun-visor shaft so that it may be installed in a stressless manner into the vehicle. But the design is rather complicated and costly.

SUMMARY OF THE INVENTION

It is an object of the present invention to provide a swivel bearing of the aforementioned type which permits rapid and easy alignment of the support arm of the sun visor shaft both at the swivel bearing end and at an outer support for the arm.

It is another object of the present invention to provide such an alignable swivel bearing in a design which is simple, inexpensive and incorporates a minimum number of parts.

The foregoing and other objects are achieved, in accordance with the invention, by allowing the mounting arm of the sun visor shaft to both turn and pivot within the mounting bore of the bearing housing. To this end, the mounting bore has, at least over part of its axial length, an opening cross section which is shaped to enable pivoting of the mounting arm.

In a preferred embodiment of the invention, the mounting bore has a changing axial cross section which, when viewed along the insertion direction, has a smaller and circular initial cross section at the insertion end of the bore, which is toward the support arm of the shaft, and has a more elliptical or oblong cross section at the outlet end of the mounting bore. The short axis of the oblong outlet opening is of about the same size as the diameter of the mounting arm of the shaft. The outlet opening of the bore is, however, considerably larger along its long axis and essentially defines a slot within the mounting bore in which the mounting arm may pivot. This allows the mounting arm to tilt and pivot from side to side in the mounting bore along the long axis.

The advantages of the invention include the displaceability of the sun-visor shaft perpendicular to the plane of the mounting arm and the compensation function by which manufacturing and installation inaccuracies can be corrected for. Also, the simplicity and inexpensiveness of the novel swivel mounting is advantageous. The adjustability in the mounting is obtained without the need for additional parts and solely on the basis of the unique shape of the mounting bore. Manufacture of the new bearing housing does not require new tools, and only a minor change in the slide or shaped part that is used to form the mounting bore is necessary. Therefore, existing production tools may be used, avoiding tool retrofit costs.

BRIEF DESCRIPTION OF THE DRAWINGS

An embodiment of the invention is explained in relation to the drawings, in which FIG. 1 is a plan view of an automobile sun visor.

FIG. 2 shows the swivel bearing of the sun visor of FIG. 1 on a larger scale and in a vertical section.

FIG. 3 is a top view in cross section that shows the relative cross sections of the mounting bore at its insertion end and at the outlet end.

DETAILED DESCRIPTION

The sun visor includes a generally rectangular, flat sun-visor body or panel 1 and a swivel bearing 20 which is arranged at one end region of an upper longitudinal edge 2 of body 1. Swivel bearing 20 includes a bearing housing 3 in which there is defined a mounting bore 6 having a bottom insertion end or inlet opening 7 of circular cross section. From inlet 7, mounting bore 6 widens conically toward outlet end opening 19, which has an elliptical or oblong shape.

As best seen in FIG. 3., oblong outlet opening 19 has a short axis 18 which is about equal to the diameter of mounting arm 8, described below. The long axis 17 of oblong opening 19 is longer than the diameter at the circular inlet opening 7. In essence, there is defined a slot 21 in mounting bore 6 within which mounting arm 8 is tiltable and pivotable. In particular, arm 8 pivots around a pivot defined by the housing 3 at the narrowed inlet 7. The long axis 17 extends along the directions in which the arm 8 tilts when the visor body is displaced in direction Y' and Y", as described below.

A sun-visor shaft 4 is disposed along longitudinal edge 2 of body 1 and is of sufficient length to form an outer support pin 5 which can be detachably inserted into an outer support housing (not shown).

Shaft 4 is L-shaped and comprises a shorter mounting arm 8 which is supported in mounting bore 6 and a support arm 9 which rotatably supports body 1. Shaft 4 may be constructed of steel or plastic material. Mounting arm 8 has a conically tapering cross section 10 which fits in the tapered mounting bore 6 and tapers narrower between the inlet and outlet ends of the bore 6. Extending from the tapering section 10 is an end region 11 carrying threads 12. End region 11 is adapted to carry a disk 13 which is ratcheted thereon. Between disk 13 and the end of bearing housing 3 is located a compression spring 15 which acts to keep conical section 10 of mounting arm 8 pulled into mounting bore 6.

Support arm 9, a portion of which forms outer support pin 5, lies along an axis of rotation X-X around which sun-visor body 1 can rotate from a rest position parallel to the ceiling of the vehicle to a position in which the sun-visor body partially blocks the windshield. If a mounting opening located in the outer support housing (not shown), in which outer support pin 5 of shaft 4 is received, is displaced from the axis of rotation X-X in a direction Y' or Y", the deviation can be absorbed or compensated for without stresses upon the visor body, shaft, bearing housing or outer support housing. Since mounting arm 8 is somewhat pivotable within the slot 21 of mounting bore 6, if the sun-visor body 1 is displaced in the direction Y', mounting arm 8 is displaceable over angular range a. On the other hand if the sun-visor body 1 is displaced in the direction Y", mounting arm 8 is movable over angular range b in the opposite direction. In this manner, the support arm 8 can be aligned parallel to axis of rotation X-X without stresses in the visor.

Although the present invention has been described in relation to particular embodiments thereof, many other variations and modifications and other uses will now become apparent to those skilled in the art. It is preferred, therefore, that the present invention be limited not by the specific disclosure herein, but only by the appended claims.

What is claimed is:

1. A swivel bearing for supporting an automobile sun visor, the bearing comprising a visor shaft which includes a mounting arm and an attached support arm which meet to define an L-shape for the shaft, the support arm of the shaft being adapted for supporting a sun visor body;
   the swivel bearing further comprising;
   a bearing housing and means for fastening the bearing housing to the body of a vehicle;
   a mounting bore defined in the bearing housing for receiving and supporting the mounting arm of the shaft therein, the mounting bore having an inlet wherein when the mounting arm is inserted in the mounting bore, the inlet is toward the support arm; the mounting bore having an outlet, the mounting bore being shaped to define at least over a part of its axial length a slot in which the mounting arm may tilt and pivot and the shaft of the sun visor is both tiltable in a cross axis direction and rotatable around its axis within the swivel bearing; the inlet of the mounting bore being relatively more circular in shape than the outlet and the outlet of the mounting bore being relatively more oblong in shape than the inlet; the dimension of the oblong outlet along one short axis thereof being substantially equal to a diameter of the mounting arm of the shaft and wherein the dimension of the oblong outlet along a long axis thereof is larger than the diameter of the relatively more circular inlet; the support arm that supports the mounting shaft and is embedded in the main part of the sun visor being substantially parallel to the windshield; the major axis of the slot thereby paralleling the support arm that supports the mounting shaft of the sun visor which support arm also supports the main body of the sun visor.

2. A swivel bearing according to claim 1 wherein the mounting bore widens from the inlet to the oulet.

3. A swivel bearing according to claim 1, wherein the mounting bore oblong shape along the short axis remains generally of the same length from the inlet to the outlet.

4. A swivel bearing according to claim 1, wherein the cross section of the mounting arm tapers narrower from the mounting bore inlet to the outlet.

5. A swivel bearing according to claim 1, wherein the mounting arm is of a length that the mounting arm emerges from the outlet of the mounting bore.

6. A swivel bearing according to claim 5, further comprising means on the part of the mounting arm that emerges from the mounting bore for holding the mounting arm to the bearing housing.

7. In combination, the swivel bearing of claim 4 and a sun visor body carried on the support arm of the sun visor shaft, the visor body and the support arm being displacable along a pathway oriented such that the mounting arm of the shaft is displacable along the long axis of the mounting bore as the visor body and the support arm are displaced along their pathway.

* * * * *